(12) United States Patent
Barland et al.

(10) Patent No.: US 8,181,422 B2
(45) Date of Patent: *May 22, 2012

(54) ENERGY-ABSORBING STRUCTURAL COMPOSITE ELEMENT

(75) Inventors: David Eugene Barland, Sedgwick, KS (US); Benjamin Scott McKinnie, Rose Hill, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/342,916

(22) Filed: Dec. 23, 2008

(65) Prior Publication Data

US 2010/0155537 A1 Jun. 24, 2010

(51) Int. Cl.
*E04C 3/29* (2006.01)
*B64C 1/00* (2006.01)
*B32B 3/26* (2006.01)
*B32B 5/18* (2006.01)
*B32B 3/00* (2006.01)

(52) U.S. Cl. ........... 52/834; 52/831; 52/843; 244/129.1; 244/133

(58) Field of Classification Search ........... 52/831, 52/834, 843, 841; 244/133, 129.1, 119, 117 R, 244/121, 131; 188/377, 376
See application file for complete search history.

(56) References Cited

U.S. PATENT DOCUMENTS

| | | | | |
|---|---|---|---|---|
| 4,336,868 A * | 6/1982 | Wilson et al. | ........... | 188/376 |
| 4,382,712 A * | 5/1983 | Buchs et al. | ........... | 403/376 |
| 4,911,381 A * | 3/1990 | Cannon et al. | ........... | 244/122 R |
| 5,366,181 A * | 11/1994 | Hansen | ........... | 244/104 R |
| 6,109,164 A * | 8/2000 | Okuhara et al. | ........... | 91/376 R |
| 6,652,222 B1 * | 11/2003 | Wojtyczka et al. | ........... | 415/9 |
| 6,698,331 B1 * | 3/2004 | Yu et al. | ........... | 89/36.02 |
| 6,959,894 B2 * | 11/2005 | Hayashi | ........... | 244/17.11 |
| 7,083,143 B2 * | 8/2006 | Whitmer et al. | ........... | 244/54 |
| 7,143,877 B2 * | 12/2006 | Dusserre-Telmon et al. | . | 188/376 |
| 7,191,982 B2 * | 3/2007 | Vetillard et al. | ........... | 244/119 |
| 7,208,222 B2 * | 4/2007 | Rolfe et al. | ........... | 428/304.4 |
| 7,334,758 B2 * | 2/2008 | Williamson et al. | ........... | 244/118.6 |
| 7,637,686 B2 * | 12/2009 | Wood et al. | ........... | 403/302 |
| 7,942,368 B2 * | 5/2011 | Lloyd | ........... | 244/123.1 |
| 7,967,251 B2 * | 6/2011 | Wood | ........... | 244/120 |
| 8,033,503 B2 * | 10/2011 | Basso | ........... | 244/119 |
| 2004/0123980 A1 * | 7/2004 | Queheillalt et al. | ........... | 165/133 |
| 2006/0070340 A1 * | 4/2006 | Fanucci et al. | ........... | 52/729.1 |
| 2008/0156935 A1 * | 7/2008 | Alby et al. | ........... | 244/119 |
| 2008/0210817 A1 | 9/2008 | Gregg et al. | | |
| 2009/0314894 A1 * | 12/2009 | Frisch et al. | ........... | 244/131 |
| 2010/0155533 A1 | 6/2010 | McKinnie et al. | ........... | 244/121 |
| 2010/0219032 A1 * | 9/2010 | Kanemasu et al. | ........... | 188/377 |
| 2010/0264271 A1 * | 10/2010 | Cortes et al. | ........... | 244/131 |
| 2011/0167759 A1 * | 7/2011 | Cesternino | ........... | 52/834 |

OTHER PUBLICATIONS http://www.recemat.com; Feb. 20, 2009.

(Continued)

*Primary Examiner* — Basil Katcheves
*Assistant Examiner* — Rodney Mintz
(74) *Attorney, Agent, or Firm* — Hovey Williams LLP

(57) ABSTRACT

A structural, energy absorbing composite element for aircraft structures includes a metallic or nonmetallic skin shell with a porous filler material insert positioned within the skin shell. The porous filler material is a material having ligaments that collapse resulting in a densification of the porous filler material in response to impact loading or a compression force sufficient to cause failure of the combined assembly.

14 Claims, 3 Drawing Sheets

OTHER PUBLICATIONS http://www.ergaerospace.com/foamproperties/aluminumproperties.htm; Feb. 20, 2009.

http://www.cymat.com/pdf/automotive_application.pdf; Feb. 20, 2009.

* cited by examiner

ENERGY-ABSORBING STRUCTURAL COMPOSITE ELEMENT

FIELD OF THE INVENTION

The present invention relates to stanchions, struts and other supports for aircraft and other vehicles. More particularly, the invention relates to a composite element for structural applications having an outer shell composed of a metallic or non-metallic composite skin and a collapsible core material. The composite element is lightweight and has high-energy absorption properties under buckling and impact conditions.

BACKGROUND

Long structural elements such as columns are utilized to vertically support other members such as a floor and must be capable of withstanding compressive, buckling, and impact loads. These structural elements must support the load of the structure it supports and added loads such as vehicles and people.

The load bearing capabilities of these structural elements is determined by the shape of their cross-section, length and material. For lighter weight applications, C or L-channels and hollow structural beams such as round, square or rectangular tubing of aluminum or composite materials are often used. Although strong by design, one disadvantage of these conventional support columns and stanchions is their lower energy absorbing properties during a failure. In crash conditions where the structure may be in compression, composite materials often buckle suddenly and absorb little energy. Failure of these structural elements, known as compressive failure, occurs when the structural elements experience ultimate compressive stresses that are beyond what the material is capable of withstanding. Additionally, buckling failure may result from column instability as a function of the height and width of the structural element.

Composite materials having multiple layered materials are often used in structural applications due to their inherent strength properties. These materials also provide great design flexibility due to the large various material selections and the ability to create various shapes. Structural composite elements often are composed of sandwich-type structure having an outer skin and a filler or core material. The outer skin, or shell, defines the shape and structure of the element whereas the filler material supports the shell.

Various materials are used for both the skin and core of a structural element and are typically chosen based upon the application and environment of use. For example, weight is often a design consideration in aerospace applications. Structural elements such as support beams of wall structures often need to be both lightweight and capable of carrying a mechanical load. In these applications, lightweight metallic skins made of aluminum and nonmetallic skins of thin carbon/epoxy or graphite/epoxy skins are often utilized. Environmental factors such as temperature and corrosive conditions are also considered when selecting skin materials.

The filler material provides both structural support and maintains the shape of the composite element. A variety of filler materials are known and range from the simple, such as balsa wood or other metallic and nonmetallic stiffeners, to complex structures such as aluminum or other nonmetallic honeycomb cores. Core materials are selected based upon their material properties such as flexibility, stiffness and strength-to-weight ratios, energy and sound absorption properties and others.

Environment must also be considered when selecting filling materials. It is not uncommon for carbon/epoxy skinned materials to absorb water, especially in aircraft applications where the structure undergoes pressurizing and depressurizing and are constantly exposed to changing atmospheric conditions. Water trapped in a composite may degrade the filler materials. Water may vaporize in warm conditions and even freeze at low temperatures and high altitudes and when undergoing these phase changes may damage the filler structure especially honeycomb-style core fillers, or disbond the filler from the skin.

Accordingly, there is a need for a lightweight composite structural element that has low structural weight, high structural strength and is capable of absorbing impact or crash energy and stabilizing long-column buckling that does not suffer from the problems and limitations of the prior art.

SUMMARY

The present invention provides a structural composite element that provides the required strength and rigidity for support columns and stanchions and provides inherent energy absorbing properties. This is achieved by the configuration of porous filler material and outer shell. The outer shell may be a metallic material made of aluminum alloys or a composite skin such as carbon/epoxy, fiberglass, metal matrix composite or other suitable composite materials.

A structural composite member constructed in accordance with an embodiment of the invention may comprise a porous core material having high mechanical energy absorption properties in all directions. The porous filler material further allows for the wicking of moisture condensation away from the skin or shell thereby reducing the onset of corrosion and chances of filler material damage.

Another exemplary embodiment of the present invention provides a lightweight structural composite element for long-columns and stanchions that have a high strength-to-weight ratio. An embodiment of the structural composite element also provides increased stiffness with higher energy absorbing characteristics during failure by compression, impact, or buckling than conventional materials.

These and other important aspects of the present invention are described more fully in the detailed description below.

DESCRIPTION OF DRAWINGS

Embodiments of the present invention are described in detail below with reference to the attached drawing figures, wherein.

Figure 1:
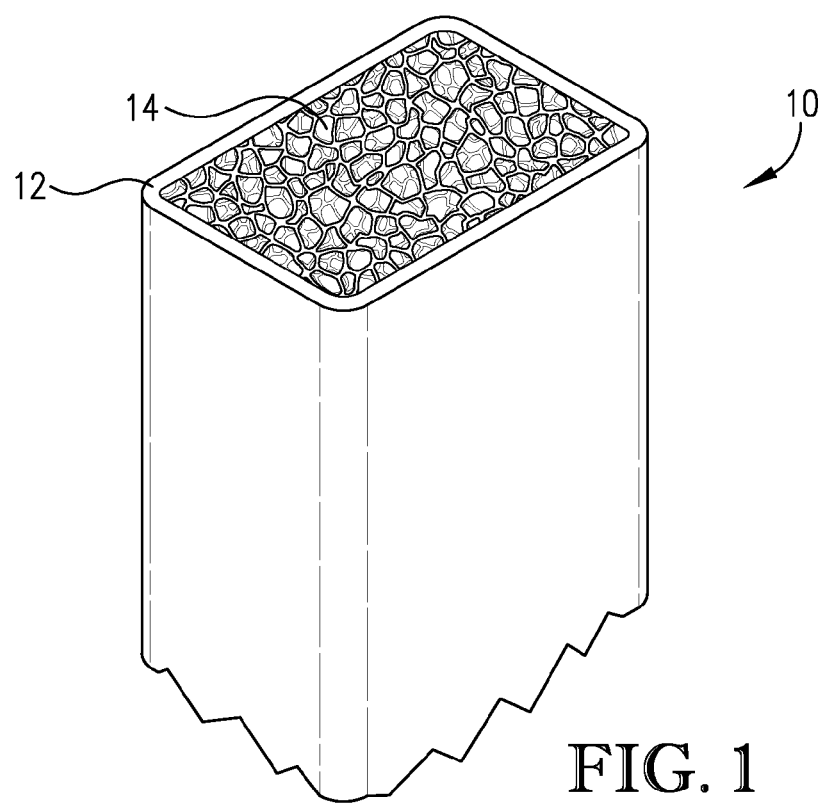
FIG. 1 is a fragmentary isometric cut-away view of a structural composite element with a porous filler material constructed in accordance with an embodiment of the invention.

The drawing figures do not limit the present invention to the specific embodiments disclosed and described herein. The drawing figures are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates a structural composite element 10 constructed in accordance with an embodiment of the invention and having a skin 12 and an porous filler material 14. The structural composite element may be used as or incorporated in to a stanchion, strut or other support element of an aircraft, vehicle, or building. In one embodiment, skin 12 may be composed of structural, load bearing materials such as aluminum alloys and other metallic materials such as nickel, Inconel or the like. Alternatively, skin 12 may be composed of a composite such as carbon/epoxy, boron/epoxy, metal matrix composite, or other advanced materials. Carbon/epoxy materials are often advantageous due to the unique structural properties of carbon fiber orientation providing excellent strength properties. The thickness of skin 12 depends upon the material selection and strength criteria. For example, thin skinned components may have skins as thin as a few 0.2 inches or for greater load carrying structures having thickness of 1 to 4 inches.

As shown in FIG. 1, skin 12 of structural composite element 10 may be formed as a rectangular, hollow beam that encases porous filler material 14. Porous filler material 14 may be composed of various metallic and nonmetallic filler materials such as porous cores. One embodiment utilizes an aluminum metallic porous filler material such as Duocel® aluminum foam manufactured by ERG Materials and Aerospace, Inc. or alternatively, stabilized aluminum foam, ("SAF") manufactured by Cymat, Co. of Canada. These porous filler materials of aluminum foam cores provide a metal skeletal structure wherein the foam contains a matrix of cells and ligaments that are regular and uniform throughout the foam. Various densities of foam, number of pores per inch, are available with each density providing different strength characteristics. Alternatively, metallic porous filler material manufactured by Recemat International of the Netherlands may be used. Recemat International produces porous filler manufactured from alternative metallic materials such as copper, nickel, and a corrosion resistant nickel-chromium alloy. Please note that the materials described above are merely examples, and equivalent materials may be produced by other manufacturers not listed herein without departing from the scope of the invention.

These porous filler materials or metallic foam cores provide ease of assembly since they may be cut, milled, ground, lapped, drilled and rolled similar to metal. Likewise, metallic porous filler material may be anodized, coated or metal plated for corrosion resistance. The metallic porous filler material can also be brazed to the skin material or adhesively bonded.

Figure 2:
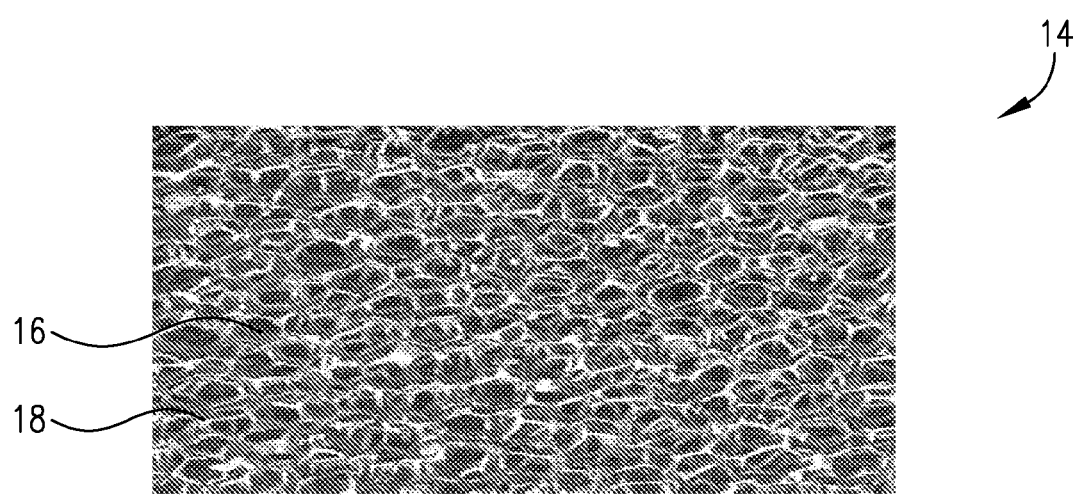
FIG. 2 is a cross-sectional view of the porous filler material of the structural composite element of FIG. 1.

FIG. 2 is a schematic representation of a cross-section of aluminum foam of porous filler material 14 showing open cell 16 and ligament structure 18. Ligament structure 18 creates multiple supports for skin 12. As skin 12 deforms under a load or impact, the load or impact energy is transferred to the ligament structure 18 of porous filler material 14. Under over load conditions or impact, ligament structure 18 fails or crushes resulting in the ligament structure 18 filling open cells 16. This densification process absorbs energy that would otherwise be redistributed to surrounding structure. The collapsing of the cells 16 of porous filler material 14 absorbs the impact energy and prevents or reduces the rebound of composite structural element 10 after compaction. Unlike conventional honeycomb-style filler materials, porous filler material 14 can absorb energy from impacts or compression in any direction. Similarly, under crash conditions that create compressive forces which typically result in buckling of the structure, ligament structure 18 absorbs the energy by collapsing and thereby stops the transfer of energy along skin 12 and reduces the severity of buckling. This advantage increases the crash worthiness of the structure.

Structural composite element 10 has greater inherent strength provided by porous filler material 14 over hollow beam type structures or those utilizing honeycomb cores. The same or increased strength properties can be realized using lighter weight skins, such as a decreased steel gauge or by material substitution such as aluminum or titanium. Thus, an advantage of the present invention is lighter weight structures having equivalent or increased strength properties.

Another advantage of open cells 16 of porous filler material 14 is that open cells 16 allow any entrapped moisture to wick away from skin 12, and travel out of the structure. This reduces the risk or effect of environmental corrosion and prolongs the service life of the element.

Porous filler material 14 also may assist in the manufacturing of the structural composite element. When skin 12 is an epoxy matrix material such as carbon/epoxy, porous filler material 14 may be used as the lay-up tool thereby eliminating the need for a mandrel. Metallic porous filler material 14 may be machined to shape and the carbon/epoxy laid on top of porous filler material 14 for a matched fit. Composite skin 12 may be adhesively bonded after cure or alternatively, adhesive may be applied to porous filler material 14 and composite skin 12 lay-up positioned on porous filler material 14 and the materials co-cured.

Figures 3, 4:
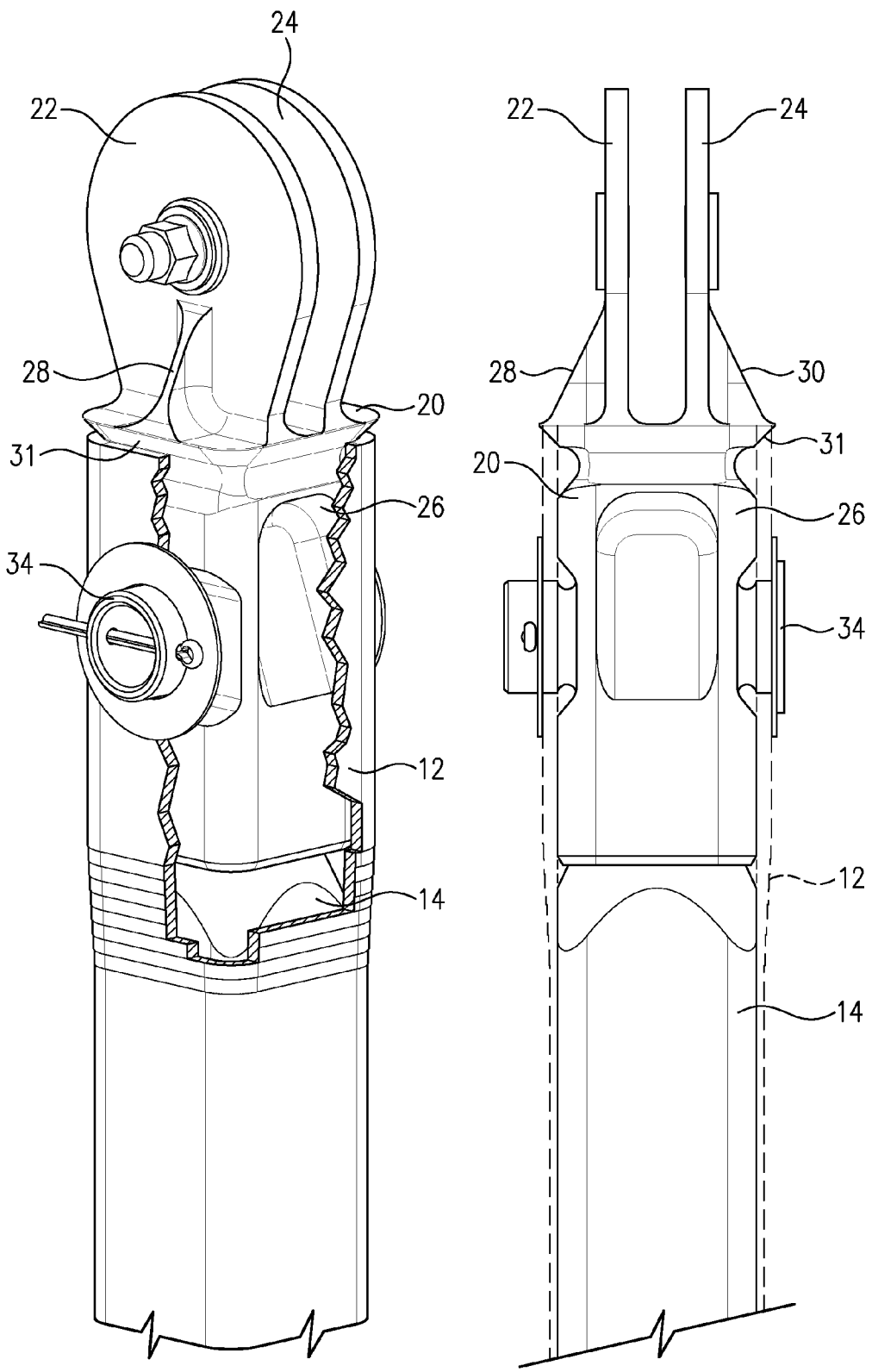
FIG. 3 is a fragmentary isometric cut-away view of the structural composite element of FIG. 1 attached to an attachment fitting.
FIG. 4 is a fragmentary side elevation view of the structural composite element with a skin shown in phantom to provide a view of the porous filler material and the attachment fitting of FIG. 3.
Figure 5:
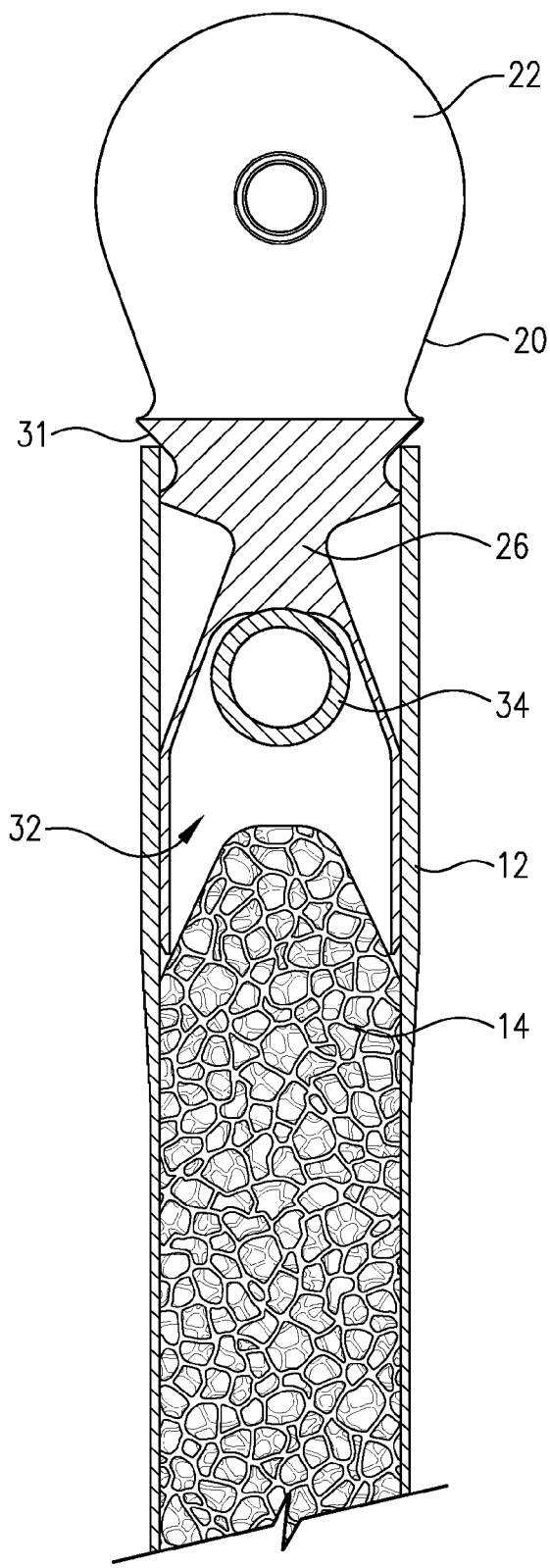
FIG. 5 is a fragmentary, cross-sectional side elevation view of the structural composite element and the attachment fitting of FIG. 3.

FIGS. 3-5 illustrate an exemplary embodiment of the structural composite element 10, wherein at least one end of the porous filer material 14 may be substantially tapered to a point or a rounded-off nub and may connect with an attachment fitting 20. The attachment fitting 20 may be a clevis fitting as shown, comprising a first flange portion 22, a second flange portion 24, and an interface portion 26 connecting the two flange portions 22,24 in a substantially U-shaped configuration and interfacing with the composite skin 12 and the porous filler material 14.

The first and second flange portions 22,24 may each have a hole formed therethrough and may be provided with further structural support by at least one brace portion 28,30, connected with at least one of the flange portions 22,24. Additionally, the attachment fitting 20 may comprise a shoulder portion 31 which may be positioned proximate and/or adjacent the brace portions 28,30 between the flange portions 22,24 and the interface portion 26. For example, the shoulder portion 31 may have a chamfered face, such as a 45-degree chamfered face, laterally swept around the attachment fitting 20 which may interface with and/or contact an end portion of the composite skin 12.

The interface portion 26 may be positioned inward of the composite skin 12 and may cover at least a portion of the tapered end of the porous filler material 14. For example, the interface portion 26 may be shaped to form a cavity 32 at an end opposite the first and second flange portions 22,24, and at least a portion of the tapered end of the porous filler material 14 may be positioned within the cavity 32.

The interface portion 26 may also have a hole formed therethrough into which a fuse pin 34 may be inserted for connecting the attachment fitting to the composite skin 12. The fuse pin 34 may be a notched fuse pin or any type of fuse pin known in the art and may be inserted through both the composite skin 12 and the interface portion 26 and secured in place.

The fuse pin 34 may shear off when a predetermined critical load value is applied. Once this happens, the attachment fitting 20 may begin to slide down the structural composite element 10, compressing it. The porous filler material 14 may stabilize the structural composite element 10 from buckling and crippling. Then the brace portions 28,30 and/or the shoulder portion 31 of the attachment fitting 20 may induce a local shear force, pressing into the composite skin 12 and beginning to shred the composite skin 12 as the attachment fitting 20 compresses the structural composite element 10. For example, the chamfered configuration of the shoulder portion 31 may be operable to force the porous filler material 14 to compress to full densification along the structural composite element 10.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent include the following:

1. A structural, energy absorbing composite element comprising:
   a monolithic skin shell;
   a porous filler material insert tapered or rounded at one end and positioned within said skin shell; and
   a single unitary attachment fitting, wherein at least a portion of the attachment fitting is positioned inward of the skin shell and adjacent at least one end of the porous filler material insert, wherein said attachment fitting comprises:
      a clevis fitting extending outward of the skin shell, and
      an interface portion integral and unitarily formed with the clevis fitting and positioned inward of the skin shell, wherein the interface portion is substantially hollow and the tapered or rounded end of the porous filler material insert is positioned at least partially within the hollow interface portion.

2. The structural, energy absorbing composite element according to claim 1 further comprising a shoulder between the clevis fitting and the interface portion, wherein the skin shell comprises a first end portion and a second end portion opposite of the first end portion, wherein the shoulder has a chamfered face engaging the first end portion or the second end portion of the skin shell.

3. The structural, energy absorbing composite element according to claim 1, further comprising:
   a fuse pin extending through the attachment fitting and the skin shell.

4. The structural, energy absorbing composite element according to claim 1 wherein the skin shell comprises a metal selected from the group of aluminum, steel, nickel, copper, zinc, and alloys thereof.

5. The structural, energy absorbing composite element according to claim 1 wherein the skin shell comprises at least one of fiber-reinforced thermal set, thermoplastic and metal matrix composite materials.

6. The structural, energy absorbing composite element according to claim 1 wherein said porous filler material insert is formed of a metallic material.

7. The structural, energy absorbing composite element according to claim 6, wherein said metallic material is one of aluminum, steel, nickel, copper, zinc, lead cobalt, cadmium and alloys thereof.

8. A passenger floor stanchion for an aircraft comprising:
   a tubular, monolithic skin shell;
   a porous filler material insert having open cells and ligaments positioned within said skin shell, and
   an attachment fitting, wherein said attachment fitting comprises:
      an interface portion at least partially located inward of the skin shell and abutting a portion of the porous filler material insert, wherein at least a portion of the porous filler material insert is located inward of the interface portion and the skin shell, wherein at least one end of the porous filler material insert is substantially tapered, and
      wherein the interface portion is substantially hollow and the tapered end of the porous filler material insert is positioned within the hollow interface portion.

9. The passenger floor stanchion according to claim 8, the attachment fitting further comprising:
   a clevis fitting extending outward of the skin shell, and
   a shoulder integrally formed with and located between the clevis fitting and the interface portion having a chamfered face engaging an end portion of the skin shell.

10. The passenger floor stanchion according to claim 8, further comprising:
    a fuse pin extending through the attachment fitting and the skin shell.

11. The passenger floor stanchion according to claim 8 wherein said tubular skin shell comprises a metal selected from the group consisting of aluminum, steel, nickel, copper, zinc, and alloys thereof.

12. The passenger floor stanchion according to claim 8 wherein said tubular skin shell comprises a composite material selected from the group consisting of fiber-reinforced thermal set, thermoplastic and metal matrix composite materials.

13. The passenger floor stanchion according to claim 8 wherein said porous filler material is formed of a metallic material.

14. The passenger floor stanchion according to claim 13 wherein said metallic material is one of aluminum, steel, nickel, copper, zinc, lead cobalt, cadmium and alloys thereof.

* * * * *